United States Patent [19]

Busquets

[11] 3,840,046
[45] Oct. 8, 1974

[54] THREE OUTLET MIXING AND DIVERTER VALVE

[76] Inventor: Agustin A. Busquets, 404 Virginia, Apt. 6, Royal Oak, Mich. 48067

[22] Filed: Sept. 13, 1973

[21] Appl. No.: 397,140

[52] U.S. Cl............. 137/549, 137/597, 137/636.2, 251/231, 251/312
[51] Int. Cl........................................... F16k 11/18
[58] Field of Search ........ 137/549, 597, 636, 636.2, 137/614.17; 251/312

[56] References Cited
UNITED STATES PATENTS

| | | | |
|---|---|---|---|
| 1,496,584 | 6/1924 | McCrink | 137/597 X |
| 2,235,651 | 3/1941 | Slezak | 137/614.17 X |
| 3,460,568 | 8/1969 | Busquets | 137/614.17 X |
| 3,612,104 | 10/1971 | Busquets | 137/637.4 |

FOREIGN PATENTS OR APPLICATIONS

| | | | |
|---|---|---|---|
| 639,157 | 6/1950 | Great Britain | 137/312 |

Primary Examiner—Alan Cohan
Assistant Examiner—Richard Gerard
Attorney, Agent, or Firm—Cullen, Settle, Sloman & Cantor

[57] ABSTRACT

A fluid mixing and diverter valve has a hollow body closed at one end with a tapered bore, hot and cold water inlets, a spout outlet, a spray outlet and a shower outlet. A tapered selector valve rotatably nested within said body and has a series of passages adapted on selective rotation so as to communicate with said inlets and selectively with one of said outlets. A cylindrical valve with passages therethrough is mounted for axial adjustments within said selector valve for variably controlling the amount of hot and cold water entering said cylindrical valve and the mixing chamber therein. Longitudinally adjustable and rotative valve stem extends through and is axially secured to the cylindrical valve for longitudinal adjustments in unison and at the same time slideably keyed to said rotative valve for rotating movements in unison. A control lever is mounted upon said body and connected at its one end to said stem whereby rotation of said lever in one plane effects selective rotary movements of the selector valve, and tilting movements of said lever in a second right angular related plane controls axial adjustments of the cylindrical valve.

10 Claims, 17 Drawing Figures

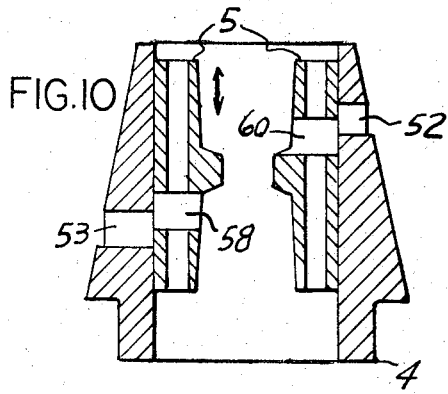
FIG.10
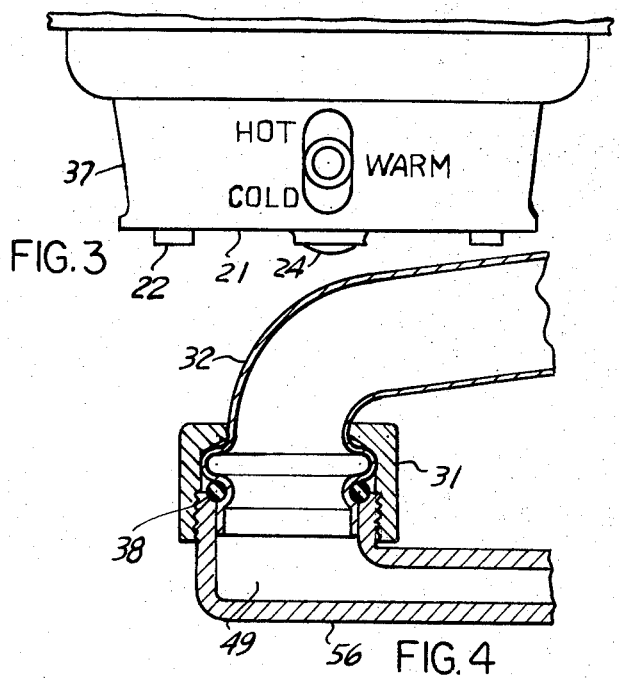
FIG.3
FIG.4
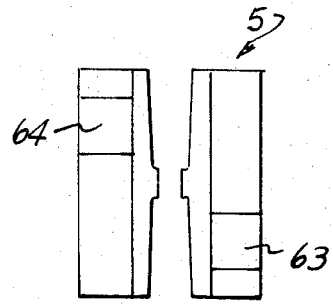
FIG.8
FIG.6
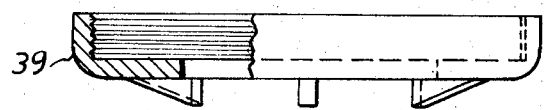
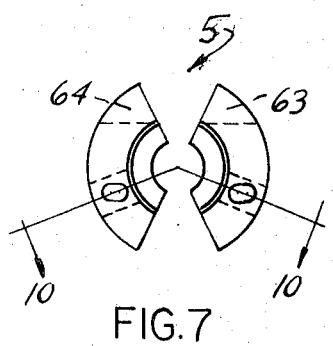
FIG.7
FIG.9
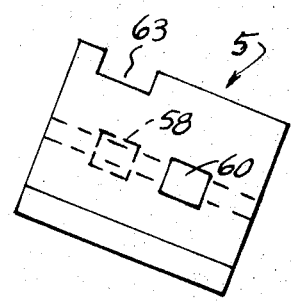
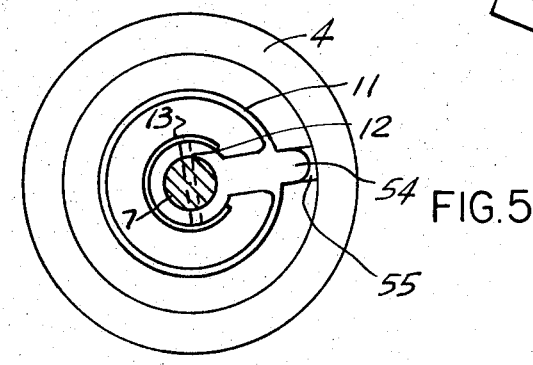
FIG.5

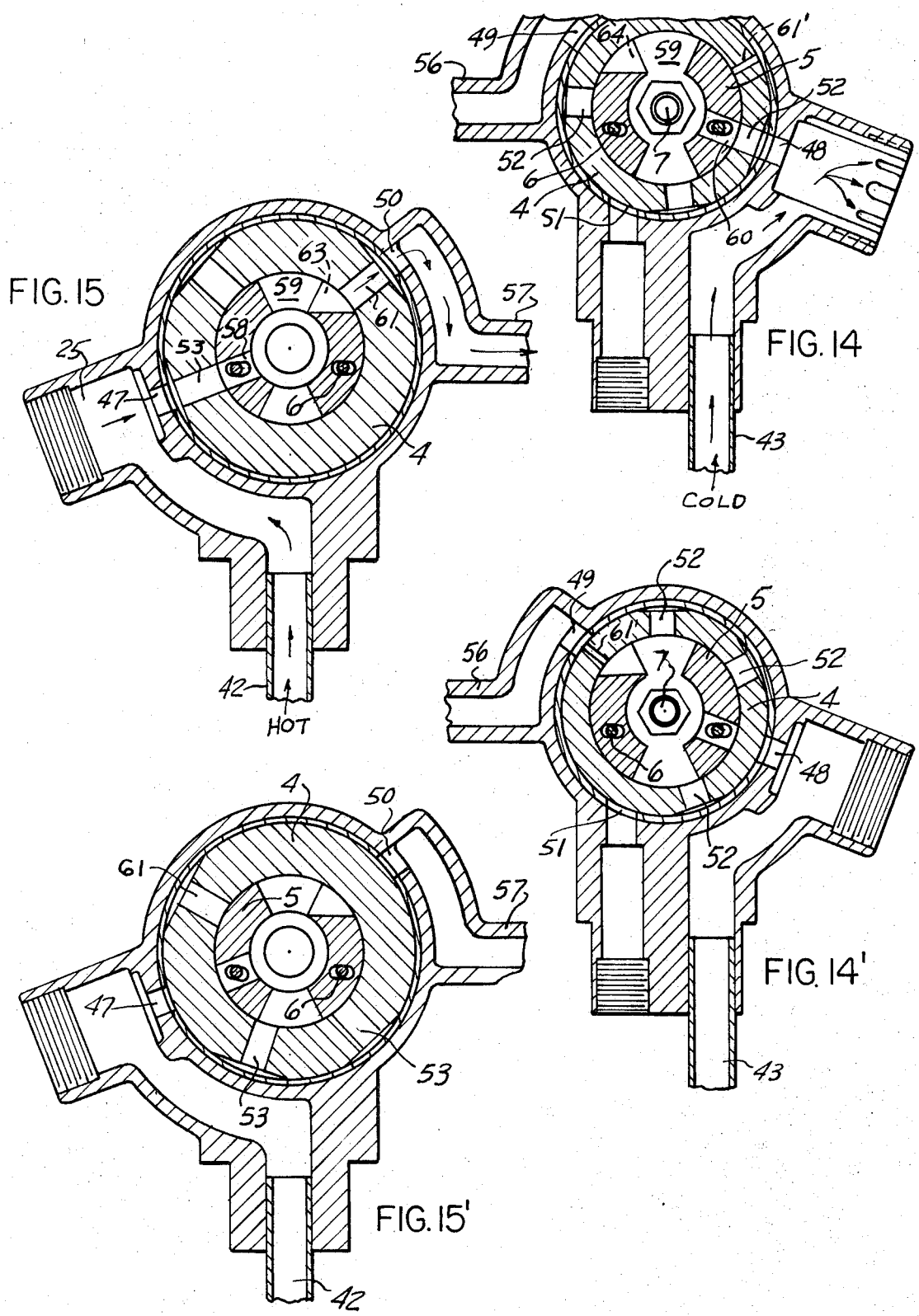

THREE OUTLET MIXING AND DIVERTER VALVE

BACKGROUND OF THE INVENTION

Heretofore various types of fluid mixing and diverter valves have been provided whereby hot and cold water in varying amounts delivered to a mixing chamber within the valve is selectively delivered to a single outlet or selectively to one of a pair of outlets.

Various involved and complicated valve constructions have been employed for accomplishing this result.

An improved mixing valve and diverter valve is shown in my U.S. Pat. No. 3,612,104 which provides one means of selectively mixing hot and cold water and delivering same to one of a series of outlets.

Another such mixing and diverter water valve is shown in my earlier issued U.S. Pat. No. 3,460,568.

BRIEF DESCRIPTION OF THE INVENTION

It is an object of the present invention to provide an improved fluid mixing and diverter valve wherein hot and cold water supplied to the valve body, in varying amounts and in varying temperatures may be delivered to one of three outlets as for example, a spout outlet, a spray outlet, or a shower outlet.

It is another object to provide an improved and simplified fluid mixing and diverter valve wherein a single control lever may be selectively and adjustably moved in a first plane for determining one of said outlets for delivery of fluids therethrough and the amount of such fluids and wherein adjustment of said lever in a second right angularlly related plane determines the temperatures of the fluids delivered.

These and other objects will be seen from the following specification and claims in conjunction with the appended drawings in which:

THE DRAWINGS:

FIG. 3 is a fragmentary plan view of a part of the valve shown in FIG. 2.

FIG. 4 a partial transverse sectional view showing the rotary attachment with a spout or shower to the valve body.

FIG. 5 is a plan view of the control ring and tongue for the selector valve.

FIG. 6 is a partly broken away side view of the gland nut for the valve inner lid.

FIG. 7 is a end view of the cylindrical valve.

FIG. 8 is a side view thereof.

FIG. 9 is an auxiliary view of the cylindrical valve shown in FIG. 7.

FIG. 10 is a longitudinally section of the cylindrical valve taken in the direction of arrows 10—10 for FIG. 7 illustrating its relationship with the selector valve.

Figure 11:
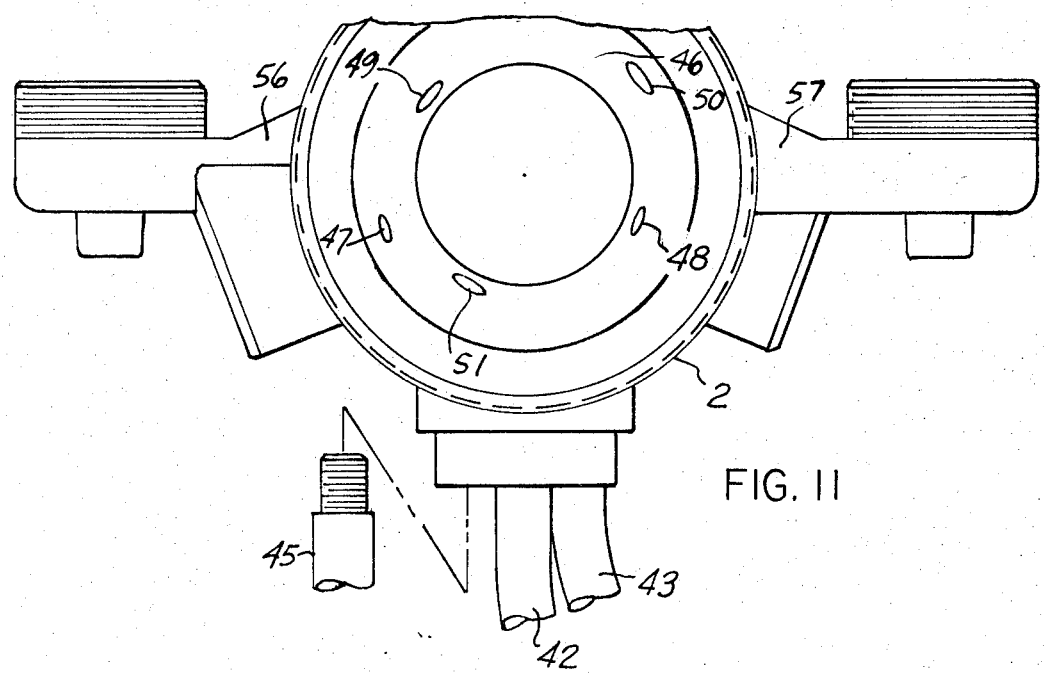

FIG. 11 is a front view of the valve body.

Figure 12:
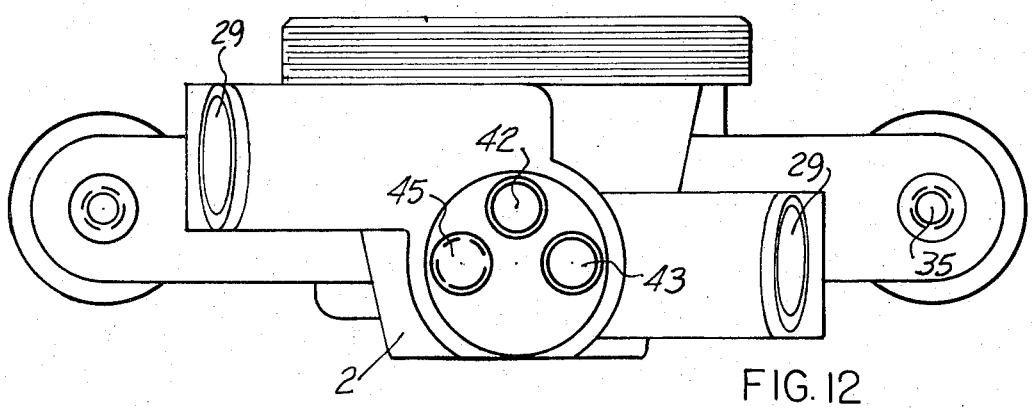

FIG. 12 is a bottom plane view thereof.

Figure 13:
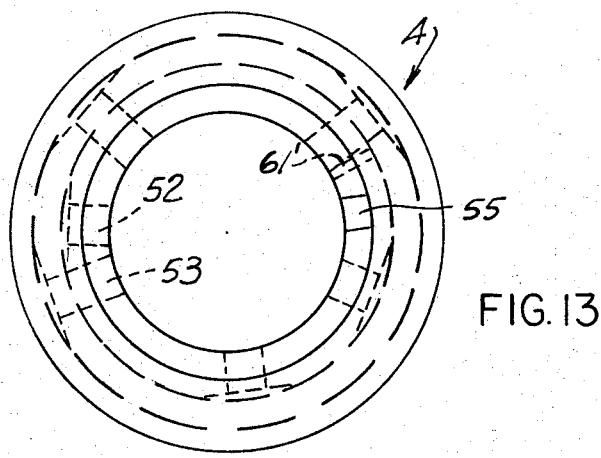

FIG. 13 is an enlarged end view of the tapered valve showing the fluid passages therethrough.

Figure 1:
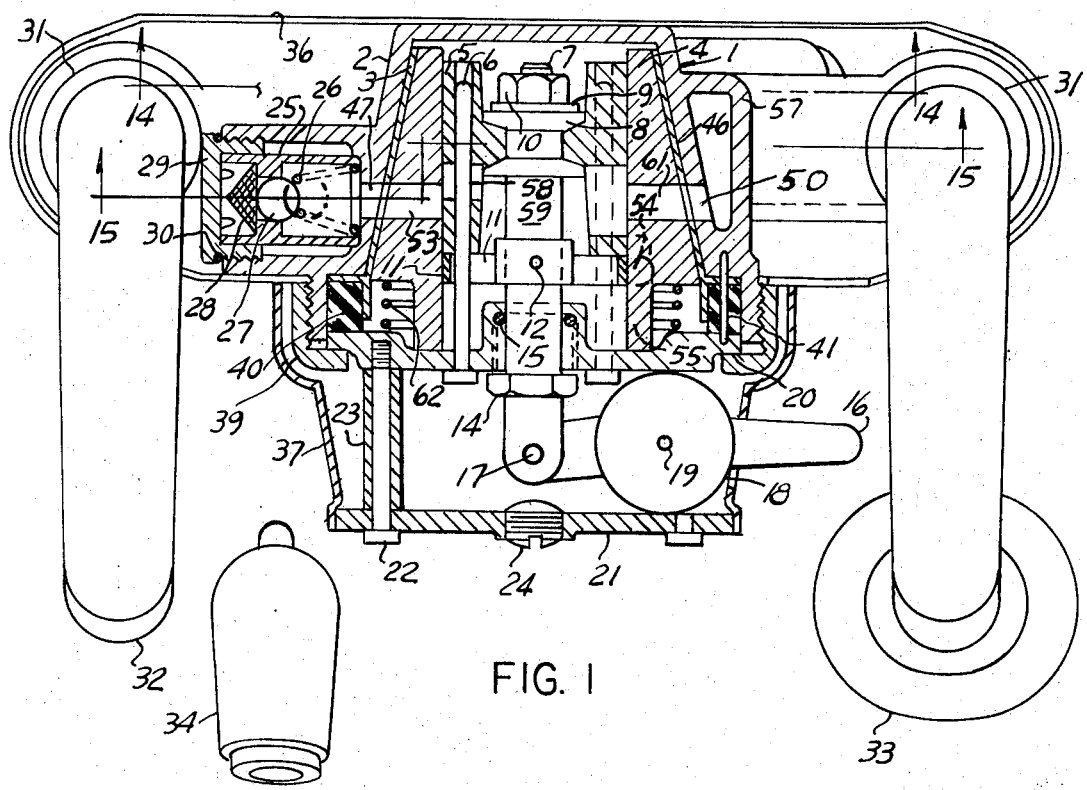
FIG. 1 is a plan section through the center line of the valve taken in the direction of arrows 1—1 of FIG. 2, with the cover partially broken away.

FIG. 14 is a transverse section of the valve in shower connection, taken in the direction of arrows 14—14 of FIG. 1.

FIG. 15 is a transverse section of the valve in shower position taken in the direction of arrows 15—15 of FIG. 1.

FIG. 14' the transverse section of the valve in "off" position taken in the direction of arrows 14—14 of FIG. 1.

FIG. 15' is a transverse section of the valve in "off" position taken in the direction of arrows 15—15 of FIG. 1.

It will be understood that the above drawings illustrate merely a preferred embodiment of the invention, and that other embodiments are contemplated within the scope of the claims hereafter setforth.

DETAILED DESCRIPTION OF THE INVENTION

Figure 2:
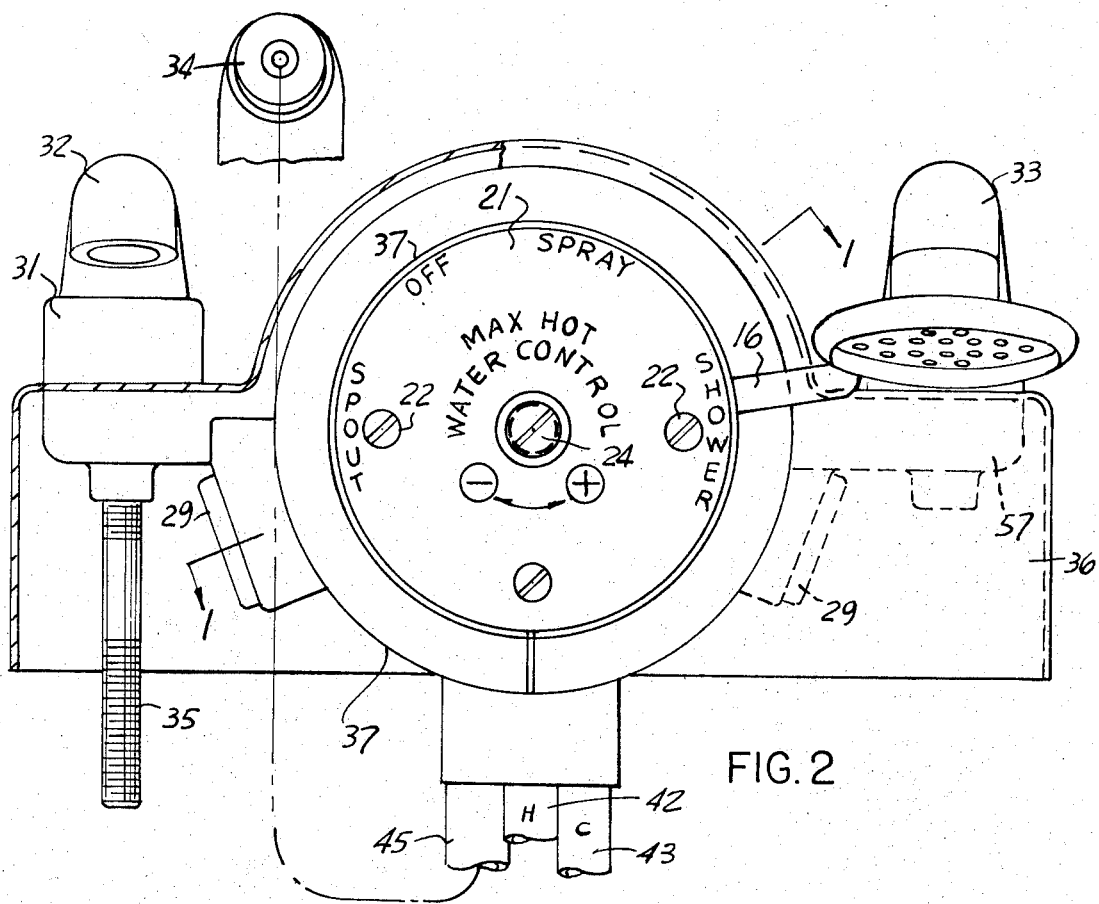
FIG. 2 is a front view of the valve with the cover and spray partly broken away.

Referring to the drawings FIGS. 1 and 2 show the present valve assembly 1 which includes a valve body 2 closed at one end and having a tapered bore 46.

Hot water inlet pipe 42 FIG. 15, communicates with the body inlet 47. The corresponding cold water inlet pipe 43 communicates with the body inlet 48 FIG. 14. Also provided within and through the body are the spaced spout outlet 49, shower outlet 50 and spray outlet 51.

Corresponding tapered valve body gasket 3 nests within bore 46 to provide a seal between said valve body and the tapered selector valve 4. Said gasket also forms a seat for the flexible gasket 40 for the inner closure lid 20 for said body. The tapered valve 4 has a first series of passages 52 and longitudinally spaced therefrom a second series of spaced passages 53, FIGS. 1,10,13,14, 15,14' and 15'.

Said tapered valve 4 also referred to as a selector valve is rotatively positioned within said bore so that in any one of the three selected positions there will be progressive communication between the respective hot and cold water inlets in the body through corresponding passages in the selector valve to the interior thereof.

The selector valve has a cylindrical bore within which is slideably positioned a two part cylindrical temperature control valve 5. Said latter valve is constrained to longitudinal movements within the selector valve and within the body in view of the pair of spaced valve guides 6 which are anchored within the body cover 20 and loosely and guideably extend into cylindrical valve 5.

Axially disposed control stem 7 sealingly extends through the gasket 15 and corresponding gland nut 14 and at its inner end is affixed to the cylindrical valve by the tapered washers 8 and a suitable fastener 10. The control ring 11 FIGS. 1 and 5 is anchored by pin 12 and snap ring 13 to said stem and includes the laterally extending tongue 54 which is slideably keyed within the corresponding longitudinal groove 55 in the selector valve.

Control lever 16 projects outwardly of rotary cover 37 FIG. 1, and at its inner end is pivotally connected at 17 to control stem 7. Outer lid 21 is spaced outwardly of lid 20 and secured thereto by fasteners 22 with suitable spacers 23 interposed.

Rotatable cover 37 at one end is journaled over and around gland nut 39 with its outer open end retainingly engaged by the outer lid 21.

The fulcrum disc 18 is pivotally connected at 19 to said lever within the rotary cover and is adapted to operatively engage inner and outer lids 20 and 21.

Thus, movement of the lever 16 in a vertical plane as viewed in FIG. 1, will effect rotation of stem 7 and the selector valve 4 connected thereto. Transverse pivotal movements of the lever 16 in a right angularly related plane relative to the axis of pin 17 and in view of said fulcrum will cause longitudinal axial movements of said stem and corresponding movements of the temperature control cylindrical valve 5.

Nested within the outer open end portion of the valve body, is a resilient flexible rubber like gasket 40 which is adjustably retained by internally flanged gland nut 39. This adjustment yieldably mounts the inner lid 20 as well as its pressure with respect to the end of the selector valve. Adjustable stud or screw 24 is threaded through a central portion of the outer lid in registry with stem 7 to limit its movement in one direction as a hot water control.

In the valve body adjacent the hot water inlet 47, there is provided a bore for an anti-siphon valve normally closed and sealed by plug 29. Anti-siphon valve 25 is nested within said bore and one side of the seat thereof includes a filter screen 28. Upon the opposite side of said seat and normally seated is the poppit valve or ball 27 biased closed with respect to said seat by the tapered spring 26. A similar construction is also provied in a corresponding bore within said body adjacent but outwardly of the cold water intake bore 48 as shown in FIG. 14. A similar anti-siphon valve filter and poppit ball valve arrangement is provided.

A spout outlet 49 FIG. 11 terminates in the spout connector 56. Over its outer end is threaded the gland nut 31 which swivelly and retainingly engages one end of the spout assembly 32 projected thereinto, with suitable o-ring seal 38 interposed FIG. 4. The spout assembly is furthermore shown in further detail in FIGS. 1 and 2.

In this construction as best shown in FIGS. 1 and 2, said gland nut retainingly engages the valve body cover 36. Upon the opposite side of the body there is a corresponding shower connector 57 which communicates with the shower outlet 50 FIG. 11. Connector 57 supportably and swivelly receives the shower assembly 33. The swivel connection is the same type shown and described with respect to FIG. 4. Additionally, the outer portions of the cover 37 are retained by the second gland nut 31 with respect to shower connector 57.

Corresponding to the spout and shower outlets 56 and 57, are bosses which mount the attachment studs 35 for anchoring the valve assembly with respect to the sink or basin or tub or the like, as shown in FIG. 2.

The spray outlet 51 in the body FIG. 11, communicates with the flexible spray hose 45 partly shown in dotted lines FIG. 2 and which terminates in the spray head 34 FIGS. 1 and 2.

OPERATION

In operation with the lever 16 rotatively positioned from the "off" position FIG. 2, to "shower" position, the selector valve has been rotated to the position shown in FIGS. 14 and 15. In FIG. 15 hot water inlet 47 communicates with selector valve passage 53 which registers with temperature control valve passage 58 for entry to the mixing chamber 59 upon the interior of the temperature control cylindrical valve.

The cold water pipe 43, FIG. 14 delivers cold water to the body inlet 48 and through the selector valve passage 52, through temperature control valve passage 60 and into said mixing chamber 59.

By the extent of rotation of the said lever, with respect to the "shower" position, the volume of liquid moving into the mixing chamber from the hot and cold water pipes can be regulated from a minimum to a maximum.

With the selector valve so set as in FIGS. 2,14 and 15, the control lever 16 may be rotated about the pin axis 19 for axially adjusting the stem 7 to regulate the amount of hot and cold water entering the mixing chamber. In FIG. 10, one direction of movement of the temperature control valve 5 hot water is increased and cold water decreased, and vice versa, when the valve is moved in the opposite direction.

With the fluids within the mixing chamber 59, FIG. 1, one passage in the group 53 in the selector valve such as passage 61 FIG. 15, communicates with shower outlet 50 FIGS. 11 and 15, through the connector 57 to the shower assembly 33, which includes a suitable shower head.

With the lever 16 rotated approximately 180° with respect to FIG. 2 to the "spout" position, one of the passages in the selector valve will be in registry with the spout outlet 49 FIGS. 4 and 14 as well as the cylinder valve outlets 63, 64 for delivery to the spout connector 56 and outlet spout 32. Two different passages 52, 53 in the selector valve communicate with the body inlets 47 and 48 from the hot and cold water inlets 42 and 43, FIGS. 14 and 15.

When the selector valve lever 16 has been moved to the intermediate "off" position shown in FIG. 2, the selector valve will have been rotated to the position shown in FIG. 14' and FIG. 15' so as to block off fluid flow into and out of the valve body.

With the selector valve lever rotated to the "spray" position shown in FIG. 2, the selector valve is rotated to such position that fluids delivered to the mixing chamber, hot and cold water are through passages 52 and 53, suitably mixed in proportions set by the cylindrical valve, will flow outwardly through the "spray" outlet 51 in the body of the valve FIG. 11 and through the flexible conduit 45 FIG. 2, to the spray head 34.

The present tapered selector valve has basically two rows of passages such as at 52 and 53 FIG. 10, i.e., upper and lower rows with the passages in each row spaced apart about a distance equal to four times the diameter of the holes. Each row consists of three or more holes in the same plane and spaced evenly with the exception of two of such holes which are separate or the distance doubled. These are to provide a "blind" spot to be used in the "shut off" position. Also, one additional small hole 61' FIG. 13 is employed as a vent passage adjacent either of the rows of said holes 52 and 53.

Any of these selector valve passages permits the water to pass from the hot and cold sources to the mixing chamber 59 and from the mixing chamber to one outlet depending upon the control setting FIG. 2. This is possible, provided the inlets to the mixing chamber are in the respective rows 52 and 53, FIG. 10. The passages in both of the rows can be aligned or can be offset. Additional passages may be employed if needed, to match any chosen position for the respective outlets 49,50 and 51.

The cylindrical valve 5 is moveable inside the tapered selector valve to control water temperature for each position of the selector valve. The volume and temperature can be controlled independently.

As shown in FIGS. 7, 8, 9, and 10, temperature control valve is split to facilitate flow from the mixing chamber out through the preselected operative passage in the selector valve. The present mixing valve may be used in the kitchen or lavatory and may be used for the bathroom tub.

As shown in FIG. 1, the coiled compression spring 62 may be employed between lid 20 and the end of the tapered valve.

It is contemplated as a part of the present invention that the spout assembly 32 can be replaced by a drinking fountain. A spring may be employed to automatically rotate the tapered valve back to its "off" position when the handle 16 is released.

Having described my invention reference should now be had to the following claims.

I claim:

1. In a fluid mixing and diverter valve, a hollow body closed at one end and having a tapered bore, hot and cold water inlets, a spout outlet, a spray outlet and a shower outlet;
    a tapered selector valve having a cylindrical bore rotatably nested in said tapered bore with longitudinally spaced sets of passages adapted for registry with said inlets, and on rotation selective progressive registry of one of said outlets and for determining the volume of flow therethrough, and including an intermediate non-registry shut off position;
    a cylindrical valve mounted within and constrained to axial movements with respect to said selector valve and having opposed displaced inlet passages to a mixing chamber therein, moveable in one direction relative to said selector valve for increasing the flow of hot water and decreasing the flow of cold water to said mixing chamber; and moveable in the opposite direction for decreasing the flow of hot water and increasing the flow of cold water;
    said selector valve passages determining flow from said mixing chamber to one of said outlets respectively;
    a centrally apertured inner lid mounted over the open end of the body and bearing against said selector valve;
    an axially adjustable and rotatable stem moveably projected and sealed through said lid, into said selector valve and cylindrical valve and affixed to said cylindrical valve for axially adjusting said cylindrical valve;
    a control ring secured to said stem having a tongue longitudinally and slideably keyed to said selector valve for rotating it selectively;
    a second lid co-axial to and spaced outwardly of and secured to said inner lid;
    an annular cover rotatively journaled at one end upon the body and at its outer end guideably retained by said second lid;
    a control lever moveably projected through said rotatable cover, at its inner end pivotally connected to said stem, and intermediate its ends fulcrumed between said lids;
    whereby rotation of said lever and its cover in a first plane simultaneously rotates said selector valve to one of a series of control positions, i.e., for fluid delivery to said spout outlet, spray outlet and shower outlet;
    and pivotal adjustment of said lever in a second right angular plane longitudinally adjusts said cylindrical valve to regulate water temperature.

2. In the mixing and diverter valve of claim 1, said second lid having on its outer face a series of spaced indicia designating rotated positions of said control lever in said first plane corresponding to "off," "spout," "spray" and "shower."

3. In the mixing and diverter valve of claim 1, anti-rotation guide pins secured to said first lid slideably projecting axially into said cylindrical valve.

4. In the mixing and diverter valve of claim 1, said body having a pair of spaced anti-siphon bores adjacent to the respective hot and cold water inlets;
    an anti-siphon valve in each bore having a seat; and a spring biased ball check normally seated on the downstream side of said seat.

5. In the mixing and diverter valve of claim 4, a filter in each said anti-siphon bore on the up stream side of said seat.

6. In the mixing and diverter valve of claim 1, an annular resilient gasket nested within the open end of the body;
    said inner lid resting on said gasket and adjustably bearing against said selector valve;
    and an internally flanged gland nut adjustably threaded over the open end of said body retainingly engaging said inner lid for regulating axial pressure to said selector valve.

7. In the mixing and diverter valve of claim 6, an apertured gasket in said bore between the body and the selector valve.

8. In the mixing and diverter valve of claim 1, a hot water control stud adjustably threaded in said outer lid in registry with said stem for limiting movements thereof in one direction.

9. In the mixing and diverter valve of claim 1, said fulcrum including a disc within the rotatable cover.

10. In the mixing and diverter valve of claim 1, and a compression spring in said bore axially interposed between said selector valve and inner lid.

* * * * *